US011969740B2

(12) United States Patent
Piramoon

(10) Patent No.: US 11,969,740 B2
(45) Date of Patent: Apr. 30, 2024

(54) SYSTEM AND METHOD FOR BALANCING A CENTRIFUGE ROTOR

(71) Applicant: Fiberlite Centrifuge LLC, Santa Clara, CA (US)

(72) Inventor: Sina Piramoon, San Jose, CA (US)

(73) Assignee: Fiberlite Centrifuge LLC, Santa Clara, CA (US)

(*) Notice: Subject to any disclaimer, the term of this patent is extended or adjusted under 35 U.S.C. 154(b) by 224 days.

(21) Appl. No.: 17/330,586

(22) Filed: May 26, 2021

(65) Prior Publication Data

US 2021/0370321 A1 Dec. 2, 2021

Related U.S. Application Data

(60) Provisional application No. 63/031,992, filed on May 29, 2020.

(51) Int. Cl.
*B04B 9/14* (2006.01)

(52) U.S. Cl.
CPC .................................... *B04B 9/14* (2013.01)

(58) Field of Classification Search
CPC ........... B04B 9/14; B04B 5/0414; B04B 7/08; B04B 9/146
See application file for complete search history.

(56) References Cited

U.S. PATENT DOCUMENTS

| | | | | |
|---|---|---|---|---|
| 8,215,508 | B2 | 7/2012 | Baird et al. | |
| 9,987,634 | B2 | 6/2018 | Piramoon | |
| 2013/0023398 | A1* | 1/2013 | Schmidt | B04B 5/0414 494/81 |
| 2019/0299221 | A1* | 10/2019 | Tomaru | B04B 7/06 |

* cited by examiner

*Primary Examiner* — Walter D. Griffin
*Assistant Examiner* — Shuyi S. Liu
(74) *Attorney, Agent, or Firm* — BakerHostetler

(57) ABSTRACT

A rotor hub assembly for a centrifuge rotor includes a rotor hub including a head portion, an elongated shaft portion extending axially away from the head portion and a central bore extending through the head portion and the shaft portion. The head portion includes a plurality of balancing bores each configured to selectively receive at least one balancing weight for balancing the centrifuge rotor. A method for balancing a centrifuge rotor is also provided.

20 Claims, 5 Drawing Sheets

SYSTEM AND METHOD FOR BALANCING A CENTRIFUGE ROTOR

CROSS-REFERENCE TO RELATED APPLICATION

The present application claims the filing benefit of U.S. Provisional Application Ser. No. 63/031,992, filed May 29, 2020, the disclosure of which is incorporated herein by reference in its entirety.

FIELD OF THE INVENTION

This invention relates generally to centrifuge rotors and, more particularly, to balancing a rotor for use with a centrifuge.

BACKGROUND OF THE INVENTION

Centrifuge rotors are typically used in laboratory centrifuges to hold samples during centrifugation. While centrifuge rotors may vary significantly in construction and in size, one common rotor structure is the fixed angle rotor having a solid rotor body with a plurality of cell hole cavities distributed radially within the rotor body and arranged symmetrically about an axis of rotation. Samples are placed in the cavities, allowing a plurality of samples to be subjected to centrifugation.

Because centrifuge rotors are commonly used in high rotation applications where the speed of the centrifuges may exceed hundreds or even thousands of rotations per minute, the centrifuge rotors must be carefully balanced. In this regard, variances in mass of the rotor load can result in an undesirable force imbalance when the rotor is at high speed. This force imbalance strains the spindle which drives the rotor and may result in damage to the centrifuge, and may also cause poor efficiency, wear, and noise. Conventional balancing techniques use a combination of samples and balance tubes which all have the same weight or use other various balancing patterns without balance tubes.

A diagnostic device or balancing machine, such as that sold commercially by American Hofmann Corporation of Lynchburg, Virginia, or by Schenck Corporation of Deer Park, New York, may be used to detect rotor imbalances and to identify specific locations on a rotor body where additional weight is needed to properly balance the rotor. Holes are then manually drilled into the rotor body, which may be constructed of carbon fiber, at the identified locations and weights are press fit into the holes in accordance with the information provided by the diagnostic device. The weights may be cylindrical bodies of metal, for example, having a particular mass to compensate for the imbalance detected by the diagnostic device.

Frequently, a rotor may need to be re-balanced multiple times throughout its life. For example, as the rotor ages and wears, the mass distribution of the rotor may change such that re-balancing of the rotor is required. When this occurs, the previously installed weights must typically be removed from the previously drilled holes and new holes must be drilled into the rotor body so that the same or new weights may be press fit into the new holes. Thus, the previously drilled holes are rendered obsolete. It is often desirable to plug the previously drilled holes for structural and/or aesthetic purposes, which requires repair of the rotor body. The cycle of drilling new holes into the rotor body and repairing the rotor body to plug previously drilled holes repeats every time the rotor is re-balanced.

Therefore, it would be desirable to provide improved systems and methods for balancing centrifuge rotors which address these and other problems associated with conventional rotors.

SUMMARY OF THE INVENTION

The present invention overcomes the foregoing and other shortcomings and drawbacks of systems and methods for balancing centrifuge rotors heretofore known. While the invention will be discussed in connection with certain embodiments, it will be understood that the invention is not limited to these embodiments. On the contrary, the invention includes all alternatives, modifications, and equivalents as may be included within the spirit and scope of the invention.

According to one embodiment, a rotor hub assembly for a centrifuge rotor is provided having a rotor hub including a head portion, an elongate shaft portion extending axially away from the head portion, and a central bore extending through the head portion and the shaft portion. The head portion includes a plurality of balancing bores each configured to selectively receive at least one balancing weight.

In order to balance the rotor, a diagnostic device may be used to detect imbalances in the rotor and to identify at least one target location on the rotor hub and at least one corresponding target amount of weight whose addition at the target location of the hub would assist in properly balancing the rotor. A suitable balancing bore corresponding to the target location may then be selected, as well as a balancing weight having a weight relatively close to the target amount of weight.

In one embodiment, the at least one balancing weight comprises at least one set screw having at least one threaded outer surface, and the plurality of balancing bores are threaded.

The head portion of the rotor hub may include a plurality of fastening bores which are each configured to selectively receive a fastener for securing at least one ring to the rotor hub. In one embodiment, the at least one ring is secured to the rotor hub and covers the at least one balancing weight inserted into at least one balancing bore. The ring may comprise at least one of a magnetic ring or an annular shield. If the ring is magnetic, the magnetic ring may include a plurality of blind bores on a top side hereof for selectively receiving a plurality of corresponding magnets. The selected arrangement of magnets on the magnet ring provides an identifiable magnetic field via the Hall effect that may be detectable by the centrifuge or a sensor/reader associated therewith so that the centrifuge may identify the rotor hub and/or rotor installed in the centrifuge. When the ring is a shield, the shield may be constructed of a highly magnetic material capable of preventing the magnetic field provided by the magnets from being directed upwardly toward the hub so as to instead focus the magnetic field downwardly toward the sensor/reader of the centrifuge.

According to another embodiment, a centrifuge rotor is provided including a rotor body having a plurality of tubular cavities, with each cavity being configured to receive a sample container therein. The centrifuge rotor further includes the rotor hub assembly as described above, wherein the rotor hub is configured to transfer torque from a centrifuge spindle to the rotor body.

A method for operating a centrifuge rotor including a rotor body having a plurality of tubular cavities and a rotor hub having a plurality of balancing bores, each being configured to selectively receive at least one of a plurality of balancing weights, is also provided.

The method according to one embodiment includes the steps of detecting imbalances in the centrifuge rotor and selectively engaging at least one of the plurality of balancing weights with at least one of the plurality of balancing bores in response to the detected imbalances.

The balancing method may also include the step of identifying at least one target location on the rotor hub and at least one corresponding target amount of weight to be added to the at least one target location under a hub for balancing the rotor.

The exemplary method may also include the step of selecting at least one of the plurality of balancing bores and at least one of the plurality of balancing weights in response to the at least one identified target location and the at least one corresponding target amount of weight, respectively.

Various additional features and advantages of the invention will become more apparent to those of ordinary skill in the art upon review of the following detailed description of the illustrative embodiments taken in conjunction with the accompanying drawings.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the invention.

DETAILED DESCRIPTION OF THE INVENTION

With reference to FIGS. 1-3B, an exemplary hub assembly 10 for a centrifuge rotor 12 (FIG. 4) according to one embodiment of the present invention is illustrated. The hub assembly 10 includes a rotor hub 14 and at least one balancing weight 16 removably embeddable in the rotor hub 14. As described in greater detail below, the balancing weight 16 may be selectively positioned in a variety of predetermined locations on the rotor hub 14 for balancing the rotor 12.

Figure 3A:
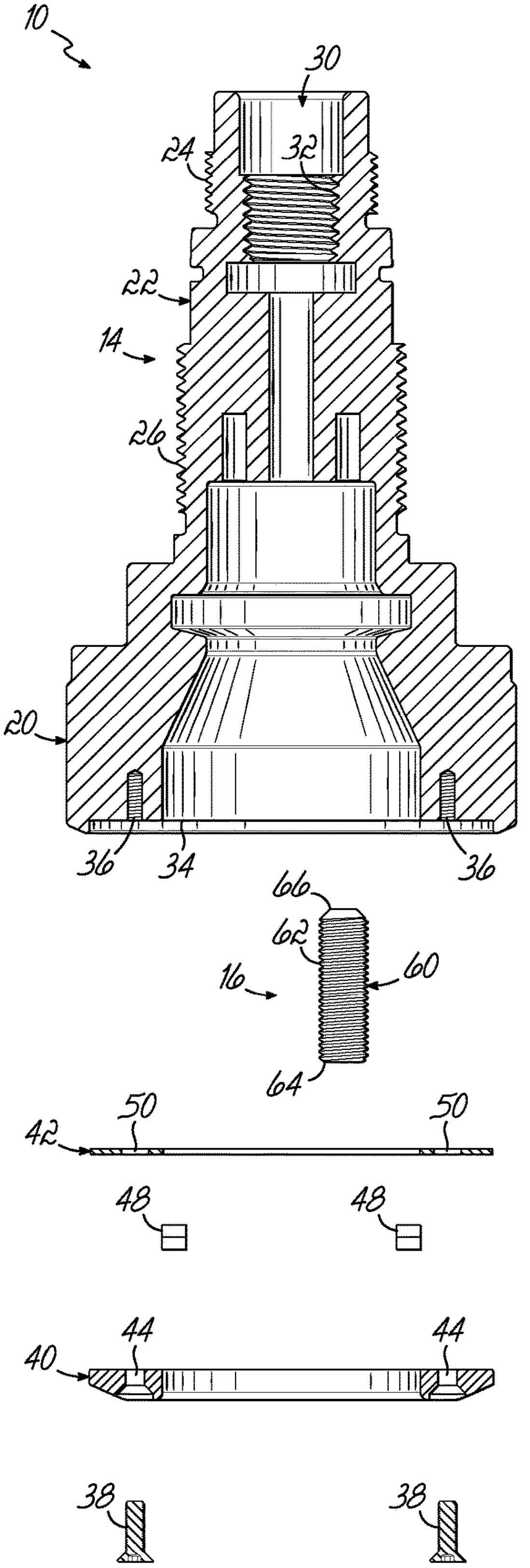
FIG. 3A is an exploded cross sectional view of the hub assembly of FIG. 1, taken along section line 3A-3A.
Figure 3B:
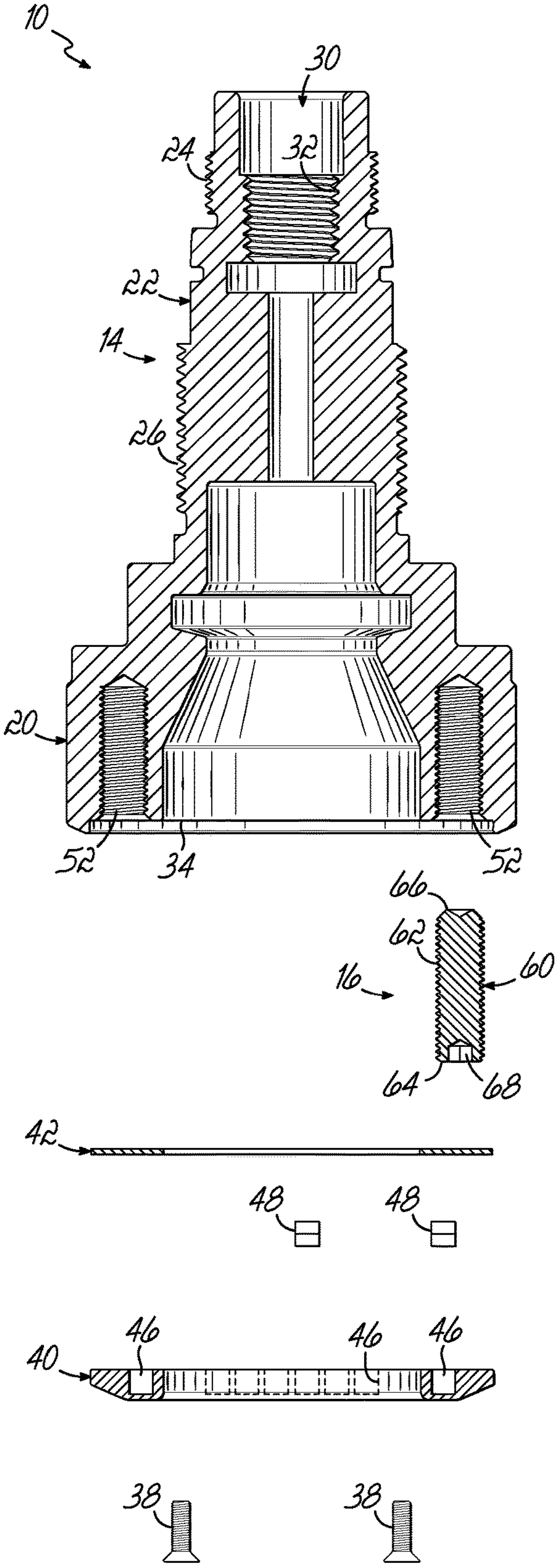
FIG. 3B is an exploded cross-sectional view of the hub assembly of FIG. 1, taken along section line 3B-3B.

The illustrated rotor hub 14, which may be constructed of a metallic material such as titanium, for example, includes a head portion 20 and an elongate shaft portion 22 extending axially from the head portion 20. The shaft portion 22 includes a threaded outer end surface 24 distal from the head portion 20 and a threaded outer middle surface 26 proximate to the head portion 20. As best shown in FIGS. 3A and 3B, a central multi-stage bore 30 extends through the head portion 20 and the shaft portion 22 of the rotor hub 14 and includes a threaded inner surface 32 located within the shaft portion 22 distal from the head portion 20.

An annular recess 34 is provided in a bottom side of the rotor hub 14 distal from the shaft portion 22 and a plurality of circumferentially spaced threaded fastening bores 36 open to the recess 34. Each of the fastening bores 36 is configured to threadably receive a corresponding fastener 38 to secure a ring such as a magnet ring 40 and/or an annular shield 42 to the bottom side of the rotor hub 14. In this regard, the illustrated magnet ring 40 includes a plurality of through holes 44 each configured to receive a corresponding one of the fasteners 38. The magnet ring 40 may also include a plurality of blind bores 46 on a top side thereof for selectively receiving a plurality of corresponding magnets 48. The selected arrangement of magnets 48 on the magnet ring 40 provides an identifiable magnetic field via the Hall effect that may be detectable by the centrifuge (or a sensor/reader associated therewith) so that the centrifuge (or a controller associated therewith) may identify the hub 14 and/or rotor 12 as will be understood by those skilled in the art. For example, the centrifuge (or a controller thereof) may compare the detected magnetic field to various magnetic field values stored in a database to identify the particular rotor 12 or type of rotor 12 in the centrifuge.

The illustrated annular shield 42 includes a plurality of through holes 50 each configured to receive a corresponding one of the fasteners 38 so that the annular shield 42 may be sandwiched between the magnet ring 40 and the head portion 20 of the rotor hub 14 within the recess 34 when the fasteners 38 are threadably received in the corresponding fastening bores 36. The shield 42 may be constructed of a highly magnetic material capable of preventing the magnetic field provided by the magnets 48 from being directed upwardly toward the hub 14 so as to instead focus the magnetic field downwardly toward the sensor/reader of the centrifuge. In one embodiment, the shield 42 may be constructed of Mu-metal (e.g., ASTM A753 Alloy 4).

The exemplary head portion 20 of the rotor hub 14 further includes a plurality of circumferentially spaced threaded balancing bores 52 opening to the recess 34. In the embodiment shown, each of the balancing bores 52 extends generally parallel to the central bore 30 of the rotor hub 14. Each of the balancing bores 52 is configured to selectively and threadably receive one of the balancing weights 16 for balancing the rotor 12. More particularly, the balancing bores 52 may be of a uniform configuration such that each of the balancing bores 52 has a same depth, cross-dimension, and/or thread pitch, for example. In this manner, each of the balancing bores 52 may be capable of threadably receiving the same balancing weight(s) 16. In the embodiment shown, the uniform configuration of the balancing bores 52 is different from the configuration of the fastening bores 36, such that the balancing bores 52 may be dedicated to receipt of the balancing weights 16 while the fastening bores 36 may be dedicated to receipt of the fasteners 38.

Figure 1:
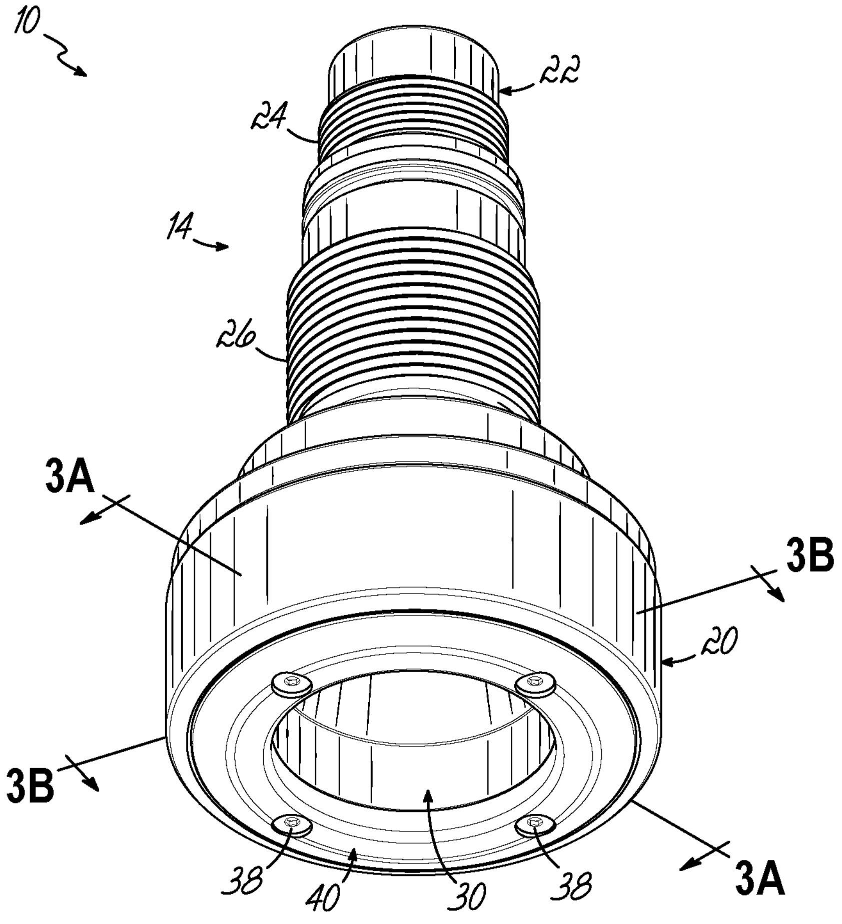
FIG. 1 is a perspective view of a hub assembly for a centrifuge rotor in accordance with one embodiment of the present invention.
Figure 2:
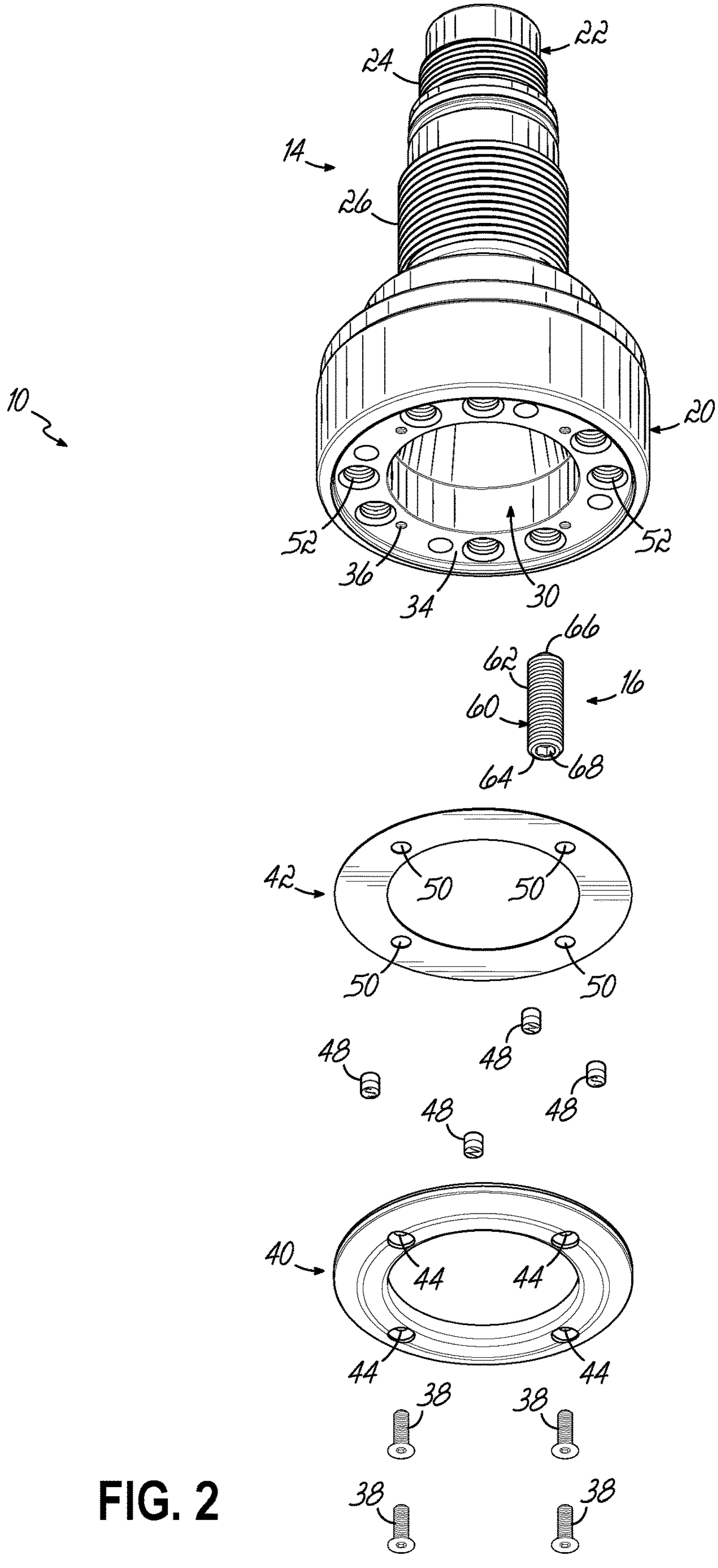
FIG. 2 is an exploded perspective view of the hub assembly of FIG. 1.

In the embodiment shown, as best shown in FIG. 2, eight balancing bores 52 are provided and are circumferentially spaced apart from each other about the central bore 30 in four pairs. Thus, the balancing bores 52 define eight predetermined locations on the rotor hub 14 for receiving the balancing weights 16. However, any suitable number of balancing bores 52 may be used at any suitable spacing. In this regard, the cross dimension of the head portion 20 may affect the available surface area for balancing bores 52, and may be increased to provide additional surface area for accommodating a greater number of balancing bores 52, for example. It will be appreciated that the number of balancing bores 52 may correlate to the number of options for placing the balancing weights 16, and may also correlate to the degree of control of the center of gravity of the rotor hub 14 which affects the stability of the rotor 12.

The illustrated balancing weight 16 includes a set screw 60 which has a threaded outer surface 62 and extends between first and second ends 64, 66 defining a length of the balancing weight 16. A hex socket 68 is provided in the first end 64 for receiving a tool, such as a wrench, to assist in advancing the balancing weight 16 into or out of one of the balancing bores 52. The threaded outer surface 62 of the balancing weight 16 allows the balancing weight 16 to be readily inserted into or removed from any of the balancing bores 52 without causing any deformation to the rotor hub 14 or any other component of the rotor 12. While the illustrated balancing weight 16 and balancing bores 52 are threaded so that the balancing weight 16 may be reliably and removably engaged with one or more of the balancing bores 52, the balancing weight 16 may be reliably and/or removably engaged with the hub 14 by any other suitable means. In one embodiment, a plurality of balancing weights 16 may be supplied having various different lengths and/or masses so that balancing weights 16 with different balancing characteristics may be selectively positioned in particular balancing bores 52 to achieve a customized balancing.

In the embodiment shown, the balancing weight(s) 16 may be covered or concealed within the corresponding balancing bore(s) 52 by the magnet ring 40 and/or annular shield 42 such that the balancing weight(s) 16 may not be visible or readily accessible from an exterior of the hub assembly 10.

Figure 4:
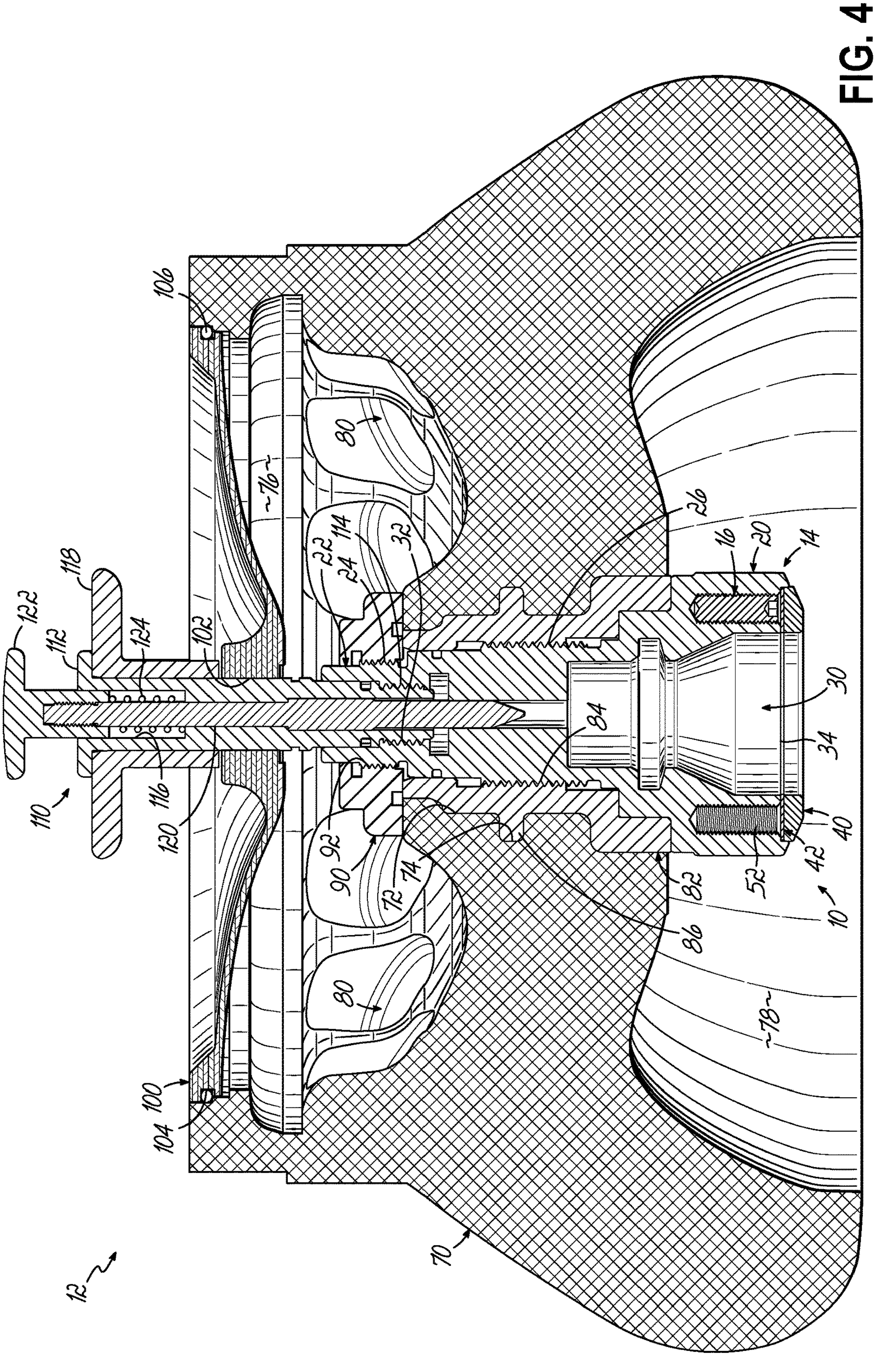
FIG. 4 is a cross-sectional view of a centrifuge rotor including the hub assembly of FIG. 1.

Referring now to FIG. 4, the rotor hub assembly 10 may be used in a centrifuge rotor 12. The rotor 12 includes a rotor body 70 symmetrical about an axis of rotation defined by the rotor hub 14, about which samples contained in sample containers (not shown) positioned in the rotor body 70 may be centrifugally rotated.

The illustrated rotor body 70 includes a generally cylindrical bore 72 for receiving at least the shaft portion 22 of the hub 14, and which is configured to be coaxial with the hub 14 such that the bore 72 may also define the axis of rotation. As shown, a plurality of depressions 74 are provided in the periphery of the bore 72, the purposes of which are described below. The rotor body 70 also includes upper and lower cavities 76, 78 adjacent opposite ends of the bore 72.

A plurality of tubular cell hole cavities 80 extend into the rotor body 70 from the upper cavity 76. Each of the cavities 80 is suitably sized and shaped to at least receive therein one of the sample containers for centrifugal rotation of the containers about the axis of rotation. It will be appreciated that any suitable number of cell hole cavities 80 may be used. As used herein, the term "tubular" refers to any suitable cross-sectional shape, including for example and not limited to rounded shapes (e.g., oval, circular or conical), quadrilateral shapes, regular polygonal or irregular polygonal shapes, or any other suitable shape. Accordingly, this term is not intended to be limited to the generally circular cross-sectional profile of the exemplary cavities 80 illustrated in the figures. In one embodiment, the rotor body 70 is constructed of carbon fiber material. For example, the rotor body 70 may be compression molded from layers of resin-coated carbon fiber laminate material.

In the embodiment shown, a rotor insert 82 is co-molded with the rotor body 70 within the bore 72. The insert 82 includes a threaded bore 84 for receiving and threadably engaging at least the threaded outer middle surface 26 of the shaft portion 22 of the hub 14 to securely seat the rotor body 70 on the hub 14. The insert 82 also includes a plurality of webs 86 which are each received within a corresponding one of the depressions 74 of the rotor body 70. In use, when the rotor 12 is spun, the hub 14 applies torque to the insert 82, and the insert 82 applies torque to the rotor body 70 via the engagement between the webs 86 and depressions 74, for example.

With the rotor body 70 seated on the rotor hub 14, a hub retainer 90 is removably fastened to the hub 14 to further facilitate holding the rotor body 70, hub 14, and insert 82 in place relative to each other. In this regard, the hub retainer 90 includes a threaded bore 92 for receiving and threadably engaging at least the threaded outer end surface 24 of the shaft portion 22 of the hub 14.

The rotor 12 also includes a lid 100 removably coupled to the rotor hub 14 over the rotor body 70 for assisting in retaining the sample containers within the rotor body 70 during rotation thereof, for example. The illustrated lid 100 is generally disc-shaped and includes a central bore 102, the purpose of which is described below, and a peripheral groove 104 for receiving an O-ring 106 to provide a fluid-tight seal between the lid 100 and the rotor body 70 when the lid 100 is removably coupled to the rotor body 70. In one embodiment, the lid 100 is constructed of carbon fiber material. For example, the lid 100 may be compression molded from layers of resin-coated carbon fiber laminate material.

As shown, the lid 100 may be removably coupled to the rotor body 70 via a lid screw 110. The illustrated lid screw includes an upper flange 112, a threaded lower outer surface 114, and a multi-stage bore 116. As shown, the threaded lower outer surface 114 is received by and threadably engages the threaded inner surface 32 of the hub 14 such that the upper flange 112 presses a spacer 118 against the lid 100. When removably coupled to the rotor body 70 via engagement of the lid screw 110 with the hub 14 and engagement of the spacer 118 with the lid 100, the lid 100 blocks access to the sample containers held in the cavities 80, such as during high speed rotation. A tie-down screw or pin 120 may be inserted through the bore 116 of the lid screw 110 and threadably coupled to a knob 122. The tie-down pin 120 may be configured for engagement with a cooperating bore of the centrifuge spindle (not shown) which accordingly assists in securing the rotor 12 to the centrifuge spindle. As shown, the tie-down pin 120 may be biased away from the centrifuge spindle by a helical spring 124. A threshold force of the helical spring 124 may be overcome to urge the tie-down pin 120 into engagement with the bore of the centrifuge spindle, which may then be actuated to drive the rotor 12 into high-speed, centrifugal rotation. As those of ordinary skill in the art will appreciate, one or more of the rotor mounting components described above may be made of any suitable metallic or non-metallic material.

In order to balance the rotor 12, a diagnostic device may be used to detect imbalances in the rotor 12 and to identify at least one target location on the hub 14 and at least one corresponding target amount of weight whose addition at the target location on the hub 14 would assist in properly balancing the rotor 12. Depending on the particular diagnostic device used, the user may input a radius value (e.g., distance from the rotational axis) indicating that the target location is desired on the hub 14 rather than on the rotor body 70. A suitable balancing bore 52 corresponding to the target location may then be selected, as well as a balancing weight 16 having a weight relatively close to the target amount of weight.

The selected at least one balancing weight 16 may then be threadably engaged with the at least one balancing bore 52 in accordance with the information provided by the diagnostic device, in order to compensate for the imbalance detected by the diagnostic device. For example, a single balancing weight 16 may be threadably engaged with one of the balancing bores 52 while the remaining balancing bores 52 may be left vacant, as shown. Alternatively, any number of balancing bores 52 may be populated with any number of balancing weights 16, as may be appropriate to achieve a desired balancing of the rotor 12. In any event, the balancing weights 16 may be concealed within the respective balancing bores 52 as described above, and the balanced rotor 12 may be safely rotated at high speeds for centrifugation.

Subsequently, the rotor 12 may be re-balanced by detecting new imbalances in the rotor 12 and by simply threadably disengaging the one or more balancing weights 16 from the respective balancing bores 52, relocating the removed balancing weight(s) 16 to different balancing bores 52, threadably engaging one or more different balancing weights 16 with one or more different balancing bores 52, and/or replacing the removed balancing weight(s) 16 with one or more balancing weights 16 having different lengths and/or masses, for example. Thus, the balancing weights 16 and balancing bores 52 may eliminate the need to repeatedly drill holes into the rotor body 70 or to plug such drilled holes when rendered obsolete during re-balancing.

While the balancing weights 16 and corresponding balancing bores 52 have been described with respect to the illustrated hub assembly 10 and rotor 12, the balancing weights 16 and balancing bores 52 may be incorporated into any suitable hub assembly and/or rotor. For example, the balancing weights 16 and balancing bores 52 may be incorporated into a hub assembly which does not feature the magnet ring 40 (including the magnets 48) and/or the annular shield 42. In such cases, a dedicated cover may be used to conceal the balancing weights 16, or the balancing weights 16 may be exposed. In addition, or alternatively, the balancing weights 16 and balancing bores 52 may be incorporated in other carbon fiber rotors of various designs, and/or in rotors constructed of different materials.

By way of example, and without limitation, other exemplary rotors that are suitable for balancing according to the rotor balancing method described herein are the model F10-4x1000 LEX, F21-8x50y, F12-6x500 LEX, F20-12x50 LEX, F14-14x50cy, F14-6x250y and F17-6x250 LEX rotors commercially available from Fiberlite Centrifuge, LLC of Santa Clara, CA, the common Applicant.

Figure 5:
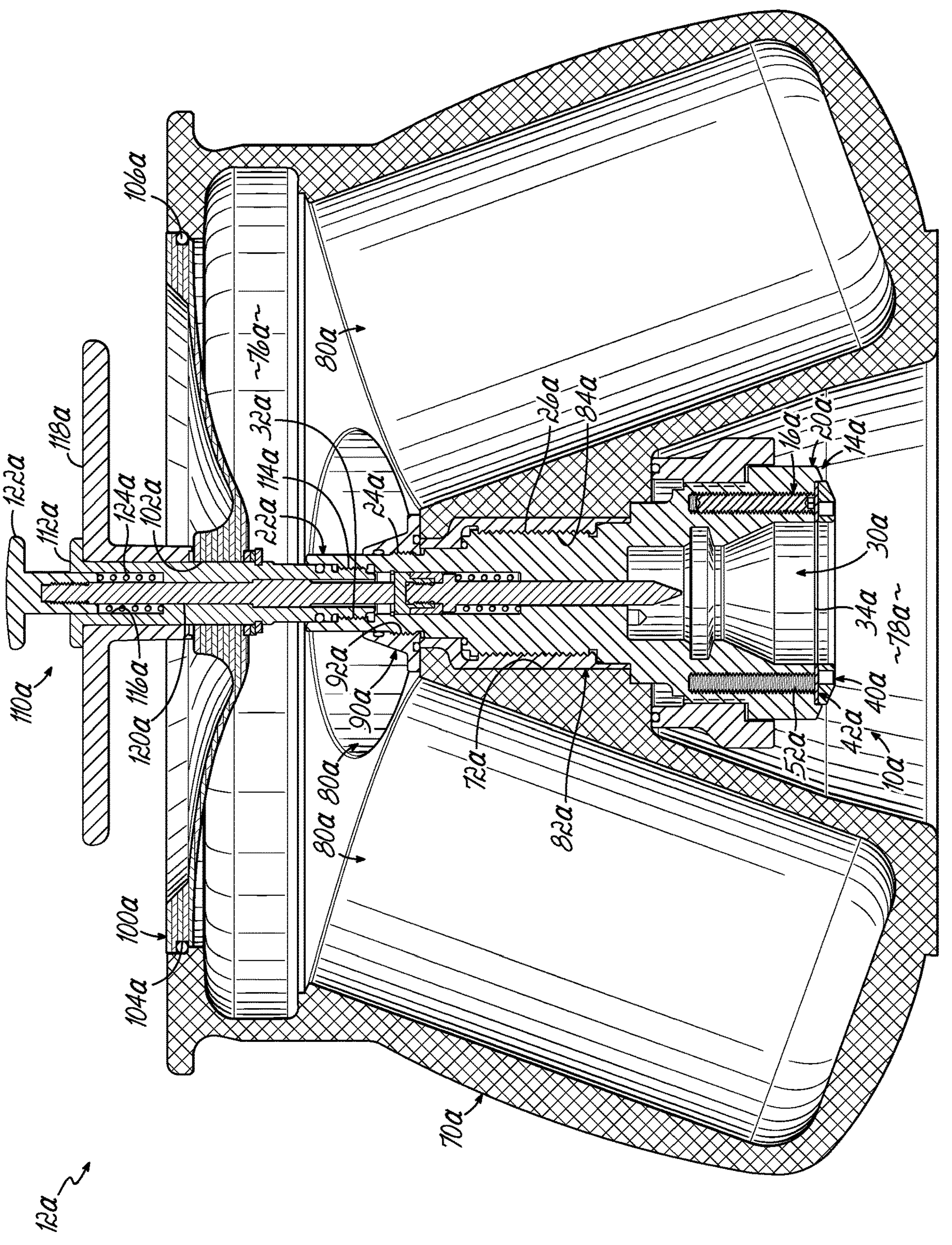
FIG. 5 is a cross-sectional view similar to FIG. 4 of a centrifuge rotor and hub assembly according to an alternative embodiment of the present invention.

FIG. 5 illustrates a centrifuge rotor 12*a* and hub assembly 10*a* according to an alternative embodiment of the present invention, such as the model F10-4x1000 centrifuge rotor of the common Applicant.

The centrifuge rotor 12*a* of FIG. 5 includes four circumferentially spaced cell hole cavities 80*a* which are each configured to removably receive a large capacity sample container therein, such as a sample container capable of holding at least 750 ml, and up to 1000 ml, of sample, by way of example. Exemplary large capacity sample containers suitable for use with the rotor 12*a* of FIG. 5 are fully described in U.S. Pat. Nos. 8,215,508 and 9,987,634, each owned by the common Applicant and incorporated herein by reference in its entirety.

Similar to the centrifuge rotor 12 and hub assembly 10 embodiment of FIG. 4, the hub assembly 10*a* for the centrifuge rotor 12*a* of FIG. 5 includes a rotor hub 14*a* and at least one balancing weight 16*a* removably embeddable in the rotor hub 14*a*, similar to the balancing weight 16 of FIG. 4.

The illustrated rotor hub 14*a*, similar to rotor hub 14 of FIG. 4, may be constructed of a metallic material such as titanium, for example, and includes a head portion 20*a* and an elongate shaft portion 22*a* extending axially from the head portion 20*a*. The shaft portion 22*a* includes a threaded outer end surface 24*a* distal from the head portion 20*a* and a threaded outer middle surface 26*a* proximate to the head portion 20*a*. A central multi-stage bore 30*a* extends through the head portion 20*a* and the shaft portion 22*a* of the rotor hub 14*a* and includes a threaded inner surface 32*a* located within the shaft portion 22*a* distal from the head portion 20*a*.

An annular recess 34*a* is provided in a bottom side of the rotor hub 14*a* distal from the shaft portion 22*a* and a plurality of circumferentially spaced threaded fastening bores (not shown), similar to fastening bores 36 of FIG. 3A, open to the recess 34*a*. Each of the fastening bores (not shown) is configured to threadably receive a corresponding fastener (not shown), similar to fastener 38 of FIGS. 3A and 3B, to secure the magnet ring 40*a* and/or annular shield 42*a* to the bottom side of the rotor hub 14*a*. The illustrated magnet ring 40*a* includes a plurality of through holes (not shown), similar to the through holes 44 of FIG. 3A, each configured to receive a corresponding one of the fasteners (not shown). The magnet ring 40*a* may also include a plurality of blind bores (not shown), similar to blind bores 46 of FIG. 3B, on a top side thereof for selectively receiving a plurality of corresponding magnets (not shown), similar to magnets 48 of FIGS. 3A and 3B. The selected arrangement of magnets on the magnet ring 40*a* provides an identifiable magnetic field via the Hall effect that may be detectable by the centrifuge (or a sensor/reader associated therewith) so that the centrifuge (or a controller associated therewith) may identify the hub 14*a* and/or rotor 12*a* as will be understood by those skilled in the art. For example, the centrifuge (or a controller thereof) may compare the detected magnetic field to various magnetic field values stored in a database to identify the particular rotor 12*a* or type of rotor 12*a* in the centrifuge.

Similar to the annular shield 42 of FIGS. 3A, 3B and 4, the annular shield 42*a* includes a plurality of through holes (not shown), similar to the through holes 50 of FIG. 3A, each configured to receive a corresponding one of the fasteners (not shown) so that the annular shield 42*a* may be sandwiched between the magnet ring 40*a* and the head portion 20*a* of the rotor hub 14*a* within the recess 34*a* when the fasteners (not shown) are threadably received in the corresponding fastening bores (not shown). As described above in connection with shield 42 of FIGS. 3A, 3B and, the shield 42*a* may be constructed of a highly magnetic material capable of preventing the magnetic field provided by the magnets (not shown) from being directed upwardly toward the hub 14*a* so as to instead focus the magnetic field downwardly toward the sensor/reader of the centrifuge. In one embodiment, the shield 42*a* may be constructed of Mu-metal (e.g., ASTM A753 Alloy 4).

The head portion 20*a* of the rotor hub 14*a* further includes a plurality of circumferentially spaced threaded balancing bores 52*a* opening to the recess 34*a*. In the embodiment shown, each of the balancing bores 52*a* extends generally parallel to the central bore 30*a* of the rotor hub 14*a*. Each of the balancing bores 52*a* is configured to selectively and threadably receive one of the balancing weights 16*a* for balancing the rotor 12*a* in a manner similar to the balancing method described in detail above in connection with the centrifuge rotor 12 of FIG. 4.

Similar to the centrifuge rotor 12 of FIG. 4, the balancing weight(s) 16*a* may be covered or concealed within the corresponding balancing bore(s) 52*a* by the magnet ring 40*a* and/or annular shield 42*a* such that the balancing weight(s) 16*a* may not be visible or readily accessible from an exterior of the hub assembly 10*a*.

As shown in FIG. 5, the rotor 12*a* includes a rotor body 70*a* symmetrical about an axis of rotation defined by the rotor hub 14*a*, about which samples contained in sample containers (not shown) positioned in the rotor body 70*a* may be centrifugally rotated.

The rotor body 70*a* of FIG. 5 includes a generally cylindrical bore 72*a* for receiving at least the shaft portion 22*a* of the hub 14*a*, and which is configured to be coaxial with the hub 14*a* such that the bore 72*a* may also define the axis of rotation.

The tubular cell hole cavities 80*a* extend into the rotor body 70*a* from the upper cavity 76*a*. Each of the cavities 80*a* is suitably sized and shaped to at least receive therein one of the sample containers for centrifugal rotation of the containers about the axis of rotation. As with the rotor 12 of FIG. 4, It will be appreciated that any suitable number of cell hole cavities 80*a* may be used. In one embodiment, similar to rotor 12 of FIG. 4, the rotor body 70*a* is constructed of carbon fiber material. For example, the rotor body 70*a* may be compression molded from layers of resin-coated carbon fiber laminate material.

In the embodiment shown, a rotor insert 82*a* is co-molded with the rotor body 70*a* within the bore 72*a*. The insert 82*a* includes a threaded bore 84*a* for receiving and threadably engaging at least the threaded outer middle surface 26*a* of the shaft portion 22*a* of the hub 14*a* to securely seat the rotor body 70*a* on the hub 14*a*.

With the rotor body 70*a* seated on the rotor hub 14*a*, a hub retainer 90*a* is removably fastened to the hub 14*a* to further facilitate holding the rotor body 70*a*, hub 14*a*, and insert 82*a* in place relative to each other. The hub retainer 90*a* includes a threaded bore 92*a* for receiving and threadably engaging at least the threaded outer end surface 24*a* of the shaft portion 22*a* of the hub 14*a*.

The rotor 12*a* also includes a lid 100*a* removably coupled to the rotor hub 14*a* over the rotor body 70*a* for assisting in retaining the sample containers within the rotor body 70*a* during rotation thereof, for example. The lid 100*a* is generally disc-shaped and includes a central bore 102*a* and a peripheral groove 104*a* for receiving an O-ring 106*a* to provide a fluid-tight seal between the lid 100*a* and the rotor body 70*a* when the lid 100*a* is removably coupled to the rotor body 70*a*. In one embodiment, the lid 100*a* is constructed of carbon fiber material. For example, the lid 100*a* may be compression molded from layers of resin-coated carbon fiber laminate material.

Similar to the lid 100 of FIG. 4, the lid 100*a* may be removably coupled to the rotor body 70*a* via a lid screw 110*a*. The illustrated lid screw includes an upper flange 112*a*, a threaded lower outer surface 114*a*, and a multi-stage bore 116*a*. As shown, the threaded lower outer surface 114*a* is received by and threadably engages the threaded inner surface 32*a* of the hub 14*a* such that the upper flange 112*a* presses a spacer 118*a* against the lid 100*a*. When removably coupled to the rotor body 70*a* via engagement of the lid screw 110*a* with the hub 14*a* and engagement of the spacer 118*a* with the lid 100*a*, the lid 100*a* blocks access to the sample containers held in the cavities 80*a*, such as during high speed rotation. A tie-down screw or pin 120*a* may be inserted through the bore 116*a* of the lid screw 110*a* and threadably coupled to a knob 122*a*. The tie-down pin 120*a* may be configured for engagement with a cooperating bore of the centrifuge spindle (not shown) which accordingly assists in securing the rotor 12*a* to the centrifuge spindle. As shown, the tie-down pin 120*a* may be biased away from the centrifuge spindle by a helical spring 124*a*. A threshold force of the helical spring 124*a* may be overcome to urge the tie-down pin 120*a* into engagement with the bore of the centrifuge spindle, which may then be actuated to drive the rotor 12*a* into high-speed, centrifugal rotation. Similar to the centrifuge rotor 12 and hub assembly 10 of FIG. 4, those of ordinary skill in the art will appreciate that one or more of the rotor mounting components described above may be made of any suitable metallic or non-metallic material.

While various aspects in accordance with the principles of the invention have been illustrated by the description of various embodiments, and while the embodiments have been described in considerable detail, they are not intended to restrict or in any way limit the scope of the invention to such detail. The various features shown and described herein may be used alone or in any combination. Additional advantages and modifications will readily appear to those skilled in the art. The invention in its broader aspects is therefore not limited to the specific details, representative apparatus and methods and illustrative examples shown and described. Accordingly, departures may be made from such details without departing from the scope of the general inventive concept.

What is claimed is:

1. A rotor hub assembly for a centrifuge rotor, the rotor hub assembly comprising:
- a rotor hub including a head portion, an elongate shaft portion extending axially away from the head portion, and a central bore extending through the head portion and the elongate shaft portion, wherein the head portion includes a plurality of balancing bores each configured to selectively receive at least one balancing weight.

2. The rotor hub assembly of claim 1, further comprising:
- at least one balancing weight received by at least one of the plurality of balancing bores.

3. The rotor hub assembly of claim 2, wherein the at least one balancing weight comprises at least one set screw having at least one threaded outer surface.

4. The rotor hub assembly of claim 2, wherein the at least one balancing weight is selected to balance the centrifuge rotor during centrifugation of the centrifuge rotor.

5. The rotor hub assembly of claim 1, wherein the head portion includes a plurality of fastening bores each configured to selectively receive a fastener for securing at least one ring to the rotor hub.

6. The rotor hub assembly of claim 5, wherein each of the balancing bores are of a first configuration and each of the fastening bores are of a second configuration different from the first configuration.

7. The rotor hub assembly of claim 1, further comprising:
- at least one ring secured to the rotor hub and covering the at least one balancing weight.

8. The rotor hub assembly of claim 7, wherein the at least one ring comprises at least one of a magnet ring or an annular shield.

9. The rotor hub assembly of claim 1, wherein the plurality of balancing bores are of a uniform configuration.

10. The rotor hub assembly of claim 1, wherein the plurality of balancing bores are circumferentially spaced apart from each other on the head portion of the rotor hub.

11. The rotor hub assembly of claim 1, wherein each of the plurality of balancing bores is threaded.

12. The rotor hub assembly of claim 1, wherein the plurality of balancing bores includes eight balancing bores.

13. The rotor hub assembly of claim 1, wherein the rotor hub is constructed of a metallic material.

14. A centrifuge rotor comprising:

a rotor body having a plurality of tubular cavities, each cavity being configured to receive a sample container therein; and the rotor hub assembly of claim 1, wherein the rotor hub is configured to transfer torque from a centrifuge spindle to the rotor body.

15. A method for operating a centrifuge rotor including a rotor body having a plurality of tubular cavities and a rotor hub having a plurality of balancing bores each configured to selectively receive at least one of a plurality of balancing weights, the method comprising:

detecting imbalances in the centrifuge rotor; and selectively engaging at least one of the plurality of balancing weights with at least one of the plurality of balancing bores in response to the detected imbalances.

16. The method of claim 15, further comprising:

identifying at least one target location on the rotor hub and at least one corresponding target amount of weight to be added at the at least one target location on the rotor hub for balancing the rotor hub.

17. The method of claim 16, further comprising:

selecting at least one of the plurality of balancing bores and at least one of the plurality of balancing weights in response to the at least one identified target location and the at least one corresponding target amount of weight, respectively.

18. The method of claim 15, wherein selectively engaging at least one of the plurality of balancing weights with at least one of the plurality of balancing bores includes threadably engaging the at least one balancing weight with the at least one balancing bore.

19. The method of claim 15, further comprising:

rotating the centrifuge rotor for centrifugation with the at least one balancing weight selectively engaged with the at least one balancing bore.

20. The method of claim 19, further comprising:

selectively disengaging the at least one balancing weight from the at least one balancing bore after centrifugation.

* * * * *